US010692045B2

(12) United States Patent
Jin

(10) Patent No.: US 10,692,045 B2
(45) Date of Patent: Jun. 23, 2020

(54) INTELLIGENT ATTENTION MANAGEMENT FOR UNIFIED MESSAGING

(75) Inventor: Hongxia Jin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 13/485,387

(22) Filed: May 31, 2012

(65) Prior Publication Data

US 2013/0325923 A1  Dec. 5, 2013

(51) Int. Cl.
*G06F 15/16* (2006.01)
*G06Q 10/10* (2012.01)
*H04L 12/58* (2006.01)

(52) U.S. Cl.
CPC .......... *G06Q 10/107* (2013.01); *H04L 51/26* (2013.01); *H04L 51/32* (2013.01); *H04L 51/36* (2013.01)

(58) Field of Classification Search
CPC .............. G06F 15/16; G06F 17/30516; G06F 17/2211; G06F 17/30705; G06F 17/30598; G06Q 10/107; G06Q 10/10; G06Q 50/50; G06Q 50/01; H04L 51/36; H04L 67/2842; H04L 51/32; H04L 51/26; H04L 51/22
USPC ........ 715/803; 709/203, 204, 206, 224, 207; 707/804, 639, 738, 765; 726/28; 705/1.1
See application file for complete search history.

(56) References Cited

U.S. PATENT DOCUMENTS

| | | | |
|---|---|---|---|
| 7,328,244 B1 * | 2/2008 | Kelley | 709/206 |
| 7,664,821 B1 * | 2/2010 | Ancin | H04L 12/5885 709/206 |
| 7,899,871 B1 * | 3/2011 | Kumar | G06Q 10/107 709/206 |
| 7,945,600 B1 * | 5/2011 | Thomas et al. | 707/804 |
| 8,392,409 B1 * | 3/2013 | Kashyap | G06Q 10/107 707/723 |
| 2003/0105827 A1 | 6/2003 | Tan et al. | |
| 2004/0059697 A1 * | 3/2004 | Forman | G06K 9/6228 706/46 |
| 2004/0078430 A1 * | 4/2004 | Aubert et al. | 709/204 |
| 2005/0138552 A1 * | 6/2005 | Venolia | G06Q 10/107 715/273 |
| 2005/0267944 A1 * | 12/2005 | Little, II | G06Q 10/107 709/207 |
| 2007/0112920 A1 * | 5/2007 | Hay | H04L 51/00 709/206 |

(Continued)

FOREIGN PATENT DOCUMENTS

| | | |
|---|---|---|
| EP | 2 312 816 | 4/2011 |
| JP | 2010049427 A * | 3/2010 |
| WO | 2010018556 | 2/2010 |

OTHER PUBLICATIONS

Yang et al., Mobile Content Delivery Technologies, Enabling Technologies for Wireless E-Business, 2006, pp. 253-298.

*Primary Examiner* — Tonia L Dollinger
*Assistant Examiner* — Schquita D Goodwin
(74) *Attorney, Agent, or Firm* — Lieberman & Brandsdorfer, LLC

(57) ABSTRACT

Embodiments of the invention relate to a method, system, and computer program product to group and prioritize communications. Attention reports are automatically generated with representative communications displayed to a user for processing. As new communications are received, they are adaptively incorporated into the groupings and prioritization, together with previously received and processed communications.

18 Claims, 11 Drawing Sheets

(56) References Cited

U.S. PATENT DOCUMENTS

| | | | |
|---|---|---|---|
| 2008/0082613 A1* | 4/2008 | Szeto | H04L 51/043 709/206 |
| 2009/0106375 A1* | 4/2009 | Carmel | G06F 40/35 709/206 |
| 2009/0144655 A1* | 6/2009 | Hardy et al. | 715/803 |
| 2009/0177754 A1* | 7/2009 | Brezina | G06Q 10/107 709/206 |
| 2009/0313346 A1* | 12/2009 | Sood | 709/207 |
| 2010/0049770 A1* | 2/2010 | Ismalon | G06F 17/30646 707/765 |
| 2010/0077041 A1* | 3/2010 | Cowan et al. | 709/206 |
| 2010/0153340 A1* | 6/2010 | Yasrebi et al. | 707/639 |
| 2010/0169417 A1 | 7/2010 | Rukman et al. | |
| 2010/0211889 A1* | 8/2010 | Durazo | G06Q 10/107 715/752 |
| 2010/0235447 A1* | 9/2010 | Goodman | G06Q 10/107 709/206 |
| 2010/0322395 A1* | 12/2010 | Michaelis | G06Q 10/107 379/88.14 |
| 2010/0325115 A1* | 12/2010 | Xu | G06F 40/177 707/749 |
| 2011/0010182 A1* | 1/2011 | Turski | G06Q 10/107 705/1.1 |
| 2011/0225659 A1* | 9/2011 | Isaacson | G06F 21/604 726/28 |
| 2011/0231499 A1 | 9/2011 | Stovicek et al. | |
| 2012/0110085 A1* | 5/2012 | Malik et al. | 709/205 |
| 2012/0215903 A1* | 8/2012 | Fleischman | G06Q 30/0201 709/224 |
| 2013/0110866 A1* | 5/2013 | Furtado | H04L 51/32 707/769 |
| 2013/0191394 A1* | 7/2013 | Bradley | G06F 17/30598 707/738 |
| 2014/0173006 A1* | 6/2014 | Mikami | H04L 51/26 709/206 |

* cited by examiner

INTELLIGENT ATTENTION MANAGEMENT FOR UNIFIED MESSAGING

BACKGROUND

This invention relates to management of electronic communications. More specifically, the invention relates to the organization and presentation of the electronic communications through a unified communication system.

The rapid development of the internet has caused users to receive increasing amounts of content from a plurality of sources, including other users, websites, and platforms. For example, users may receive communications and updates from social platforms and may also receive alerts and updates from web-based material such as online newspapers or enterprise collaboration systems. The growth of electronic communication has resulted in a large quantity of messages sent and received by users.

To organize messages, a unified messaging system is employed to provide a single interface for users to receive and process information from multiple sources. However, the unified messaging system is not a complete solution to the plethora of communications that are sent and received between senders and receivers. Rather, the unified message system merely provides a single interface to send and receive messages, with no regard to organization or prioritization.

BRIEF SUMMARY

This invention comprises a method, system, and article for categorizing communications into activity areas and prioritizing communications within each activity area.

In one aspect, a method is provided to organize forms of electronic communication. More specifically, electronic communications are grouped into clusters, thereby forming clustered data. One of more activity areas are derived from the clustered data, with each activity area is a defined community of interconnected participants. Each communication received in an activity area is classified, thereby creating a grouping of communications within each activity area. Based on the classification, an attention report illustrating the created grouping of communications is generated. The attention report includes a representative communication shown for each activity area.

In another aspect, a computer program product for use with electronic communication data is provided with a computer readable storage medium having computer readable program code embodied therewith. Computer readable program code is configured to organize and prioritize electronic communications. The computer readable program code forms clustered data by placing electronic communications into groups, and derives one or more activity areas from the clustered data. Each activity area is a defined community of interconnected participants. Computer readable program code is provided to classify each received communication into at least one of the derived activity areas, thereby allowing multiple communications to fall within an activity area. Computer readable program code is further provided to generate an attention report to illustrate various groupings of communications. One of more communications is selected as representative communications from each activity area.

In a further aspect, a system is provided with a shared pool of configurable resources. The shared pool includes a physical host in communication with two or more physical machines. The physical host is provided with a processing unit in communication with a memory module and data storage. A functional unit is provided local to the memory module and in communication with the processing unit. The functional unit includes tools to support organization and intelligent viewing of electronic communications. The tools include, but are not limited to, a cluster manager and a report manager. The cluster manager is configured to organize electronic communications into clusters, and to derive at least one activity area from the clustered communications. The cluster manager is further configured to assign each electronic communication to at least one activity area, and to group communications assigned to like activity areas. The report manager, which is in communication with the cluster manager, is configured to generate an attention report based on the organization of the received electronic communication as provided by the cluster manager. The attention report illustrating the activity areas to which each communication is grouped, including any number of representative communications for each activity area.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
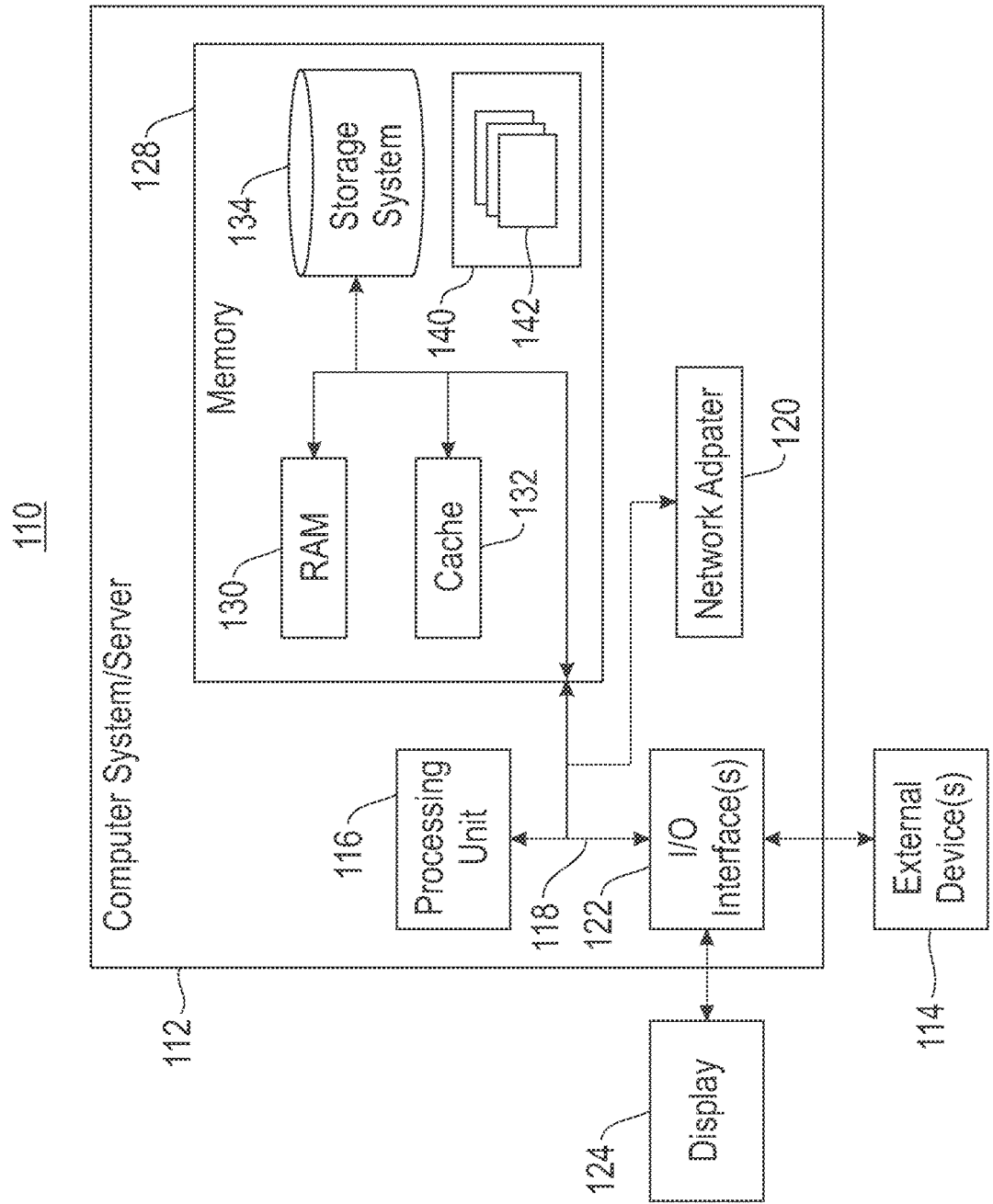
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit(s) described in this specification has been labeled with tools in the form of managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an application manager, a replication manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (110) is only one example of a suitable cloud computing node and is not intended to suggest any limitation as to the scope of use or functionality of embodiments of the invention described herein. Regardless, cloud computing node (110) is capable of being implemented and/or performing any of the functionality set forth hereinabove. In cloud computing node (110) there is a computer system/server (112), which is operational with numerous other general purpose or special purpose computing system environments or configurations. Examples of well-known computing systems, environments, and/or configurations that may be suitable for use with computer system/server (112) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (112) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (112) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (112) in cloud computing node (110) is shown in the form of a general-purpose computing device. The components of computer system/server (112) may include, but are not limited to, one or more processors or processing units (116), a system memory (128), and a bus (118) that couples various system components including system memory (128) to processor (116). Bus (118) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (112) typically includes a variety of computer system readable media. Such media may be any available media that is accessible by a computer system/server (112), and it includes both volatile and non-volatile media, and removable and non-removable media.

System memory (128) can include computer system readable media in the form of volatile memory, such as random access memory (RAM) (130) and/or cache memory (132). Computer system/server (112) may further include other removable/non-removable, volatile/non-volatile computer system storage media. By way of example only, storage system (134) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (140), having a set (at least one) of program modules (142), may be stored in memory (128) by way of example, and not limitation, as well as an operating system, one or more application programs, other program modules, and program data. Each of the operating systems, one or more application programs, other program modules, and program data or some combination thereof, may include an implementation of a networking environment. Program modules (142) generally carry out the functions and/or methodologies of embodiments of the invention as described herein.

Computer system/server (112) may also communicate with one or more external devices (114), such as a keyboard, a pointing device, a display (124), etc.; one or more devices that enable a user to interact with computer system/server (112); and/or any devices (e.g., network card, modem, etc.) that enable computer system/server (112) to communicate with one or more other computing devices. Such communication can occur via Input/Output (I/O) interfaces (122). Still yet, computer system/server (112) can communicate with one or more networks such as a local area network (LAN), a general wide area network (WAN), and/or a public network (e.g., the Internet) via network adapter (120). As depicted, network adapter (120) communicates with the other components of computer system/server (112) via bus (118). It should be understood that although not shown, other hardware and/or software components could be used in conjunction with computer system/server (112). Examples, include, but are not limited to: microcode, device drivers, redundant processing units, external disk drive arrays, RAID systems, tape drives, and data archival storage systems, etc.

Figure 2:
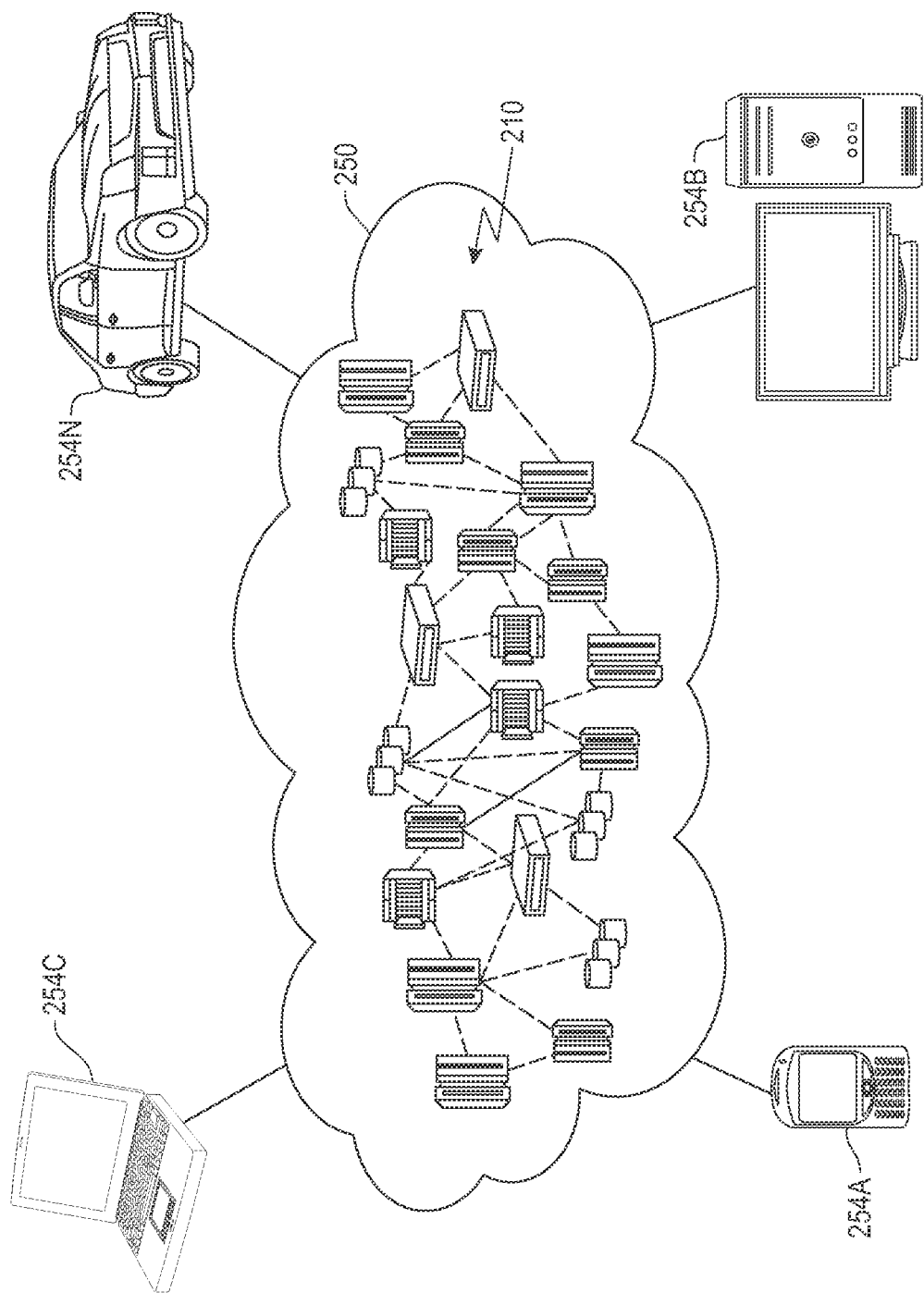
FIG. 2 depicts a cloud computing environment according to an embodiment of the present invention.

Referring now to FIG. 2, illustrative cloud computing environment (250) is depicted. As shown, cloud computing environment (250) comprises one or more cloud computing nodes (210) with which local computing devices used by cloud consumers, such as, for example, personal digital assistant (PDA) or cellular telephone (254A), desktop computer (254B), laptop computer (254C), and/or automobile computer system (254N) may communicate. Nodes (210) may communicate with one another. They may be grouped (not shown) physically or virtually, in one or more networks, such as Private, Community, Public, or Hybrid clouds as described hereinabove, or a combination thereof. This allows cloud computing environment (250) to offer infrastructure, platforms and/or software as services for which a cloud consumer does not need to maintain resources on a local computing device. It is understood that the types of computing devices (254A)-(254N) shown in FIG. 2 are intended to be illustrative only and that computing nodes (210) and cloud computing environment (250) can communicate with any type of computerized device over any type of network and/or network addressable connection (e.g., using a web browser).

Figure 3:
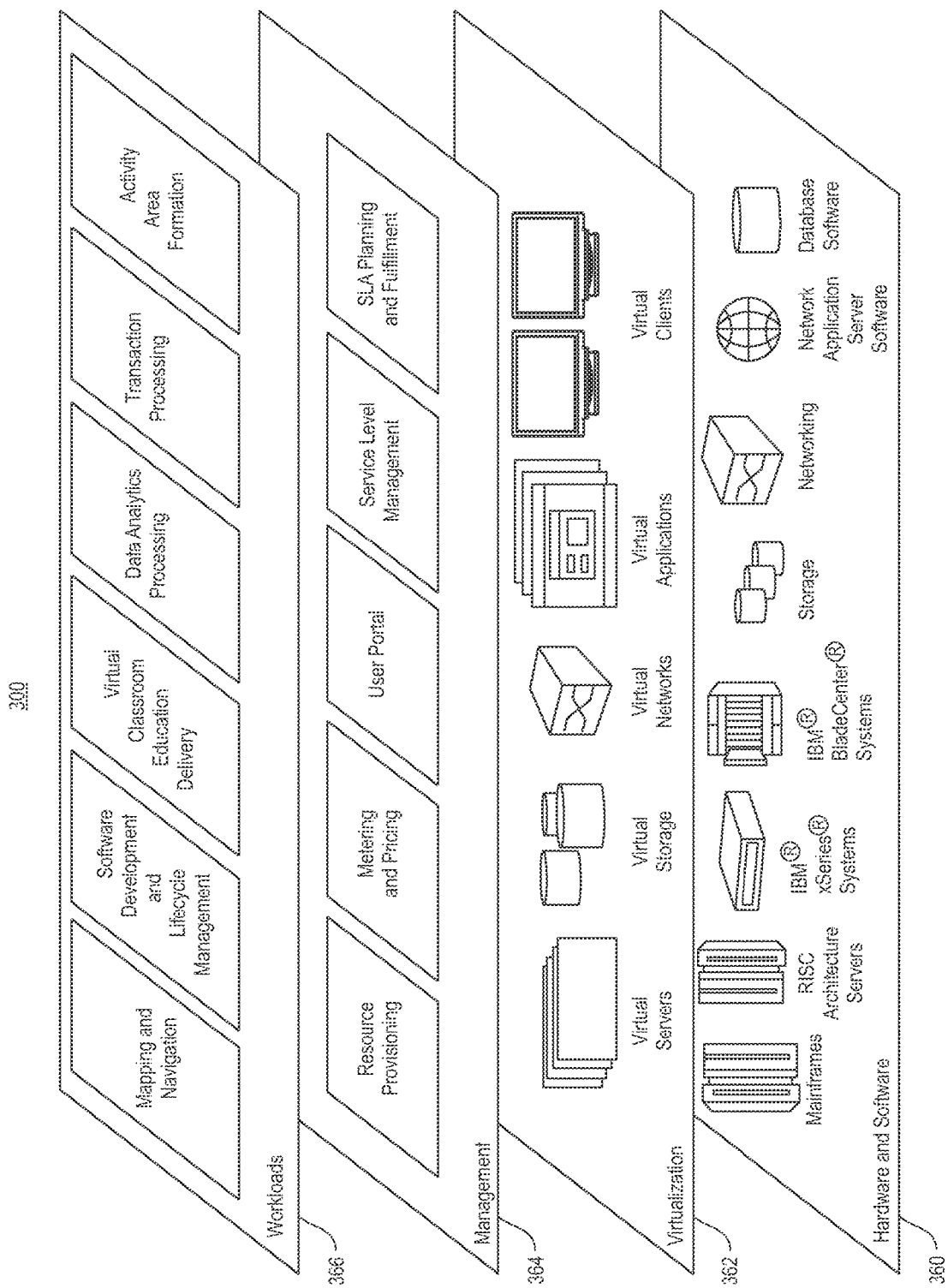
FIG. 3 depicts abstraction model layers according to an embodiment of the present invention.

Referring now to FIG. 3, a set of functional abstraction layers (300) provided by cloud computing environment (250) is shown. It should be understood in advance that the components, layers, and functions shown in FIG. 3 are intended to be illustrative only and embodiments of the invention are not limited thereto. As depicted, the following layers and corresponding functions are provided: hardware and software layer (360), virtualization layer (362), management layer (364), and workload layer (366). The hardware and software layer (360) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (362) provides an abstraction layer from which the following examples of virtual entities may be provided: virtual servers; virtual storage; virtual networks, including virtual private networks; virtual applications and operating systems; and virtual clients.

In one example, management layer (364) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (366) provides examples of functionality for which the cloud computing environment may be utilized. An example of workloads and functions which may be provided from this layer includes, but is not limited to, organization and management of electronic communications within the cloud computing environment. With the growing popularity of social networks and collaboration systems, people are increasingly working with or socially connected with each other. A unified messaging system provides a single interface for users in the cloud computing environment to receive and process information from multiple sources.

In the shared pool of configurable computer resources described herein, hereinafter referred to as a cloud computing environment, files may be shared among users within multiple data centers, also referred to herein as data sites. A series of mechanisms are provided within the shared pool to provide organization and management of electronic communications. Several knowledge bases are employed with respect to the management and organization of the communications, including importance, time sensitivity, and relevance. An attention management solution employs analytical techniques to learn the interests of a user and to organize and prioritize incoming messages based on the user interests. For a list of unread messages, an attention report is generated to allow users to efficiently scan important new messages. In one embodiment, the attention report is an abbreviated presentation of messages. The unified message system provides a single interface for users to receive and process information from multiple sources. The attention management solution functions with the interface to process and prioritize the messages. For example, the received messages may come from social networks, collaboration tools, customer relationship management tools, etc. Accordingly, the attention management solution functions with communications received from a diverse set of resources, and to organize and prioritize the messages to enable selective processing.

Figure 4:
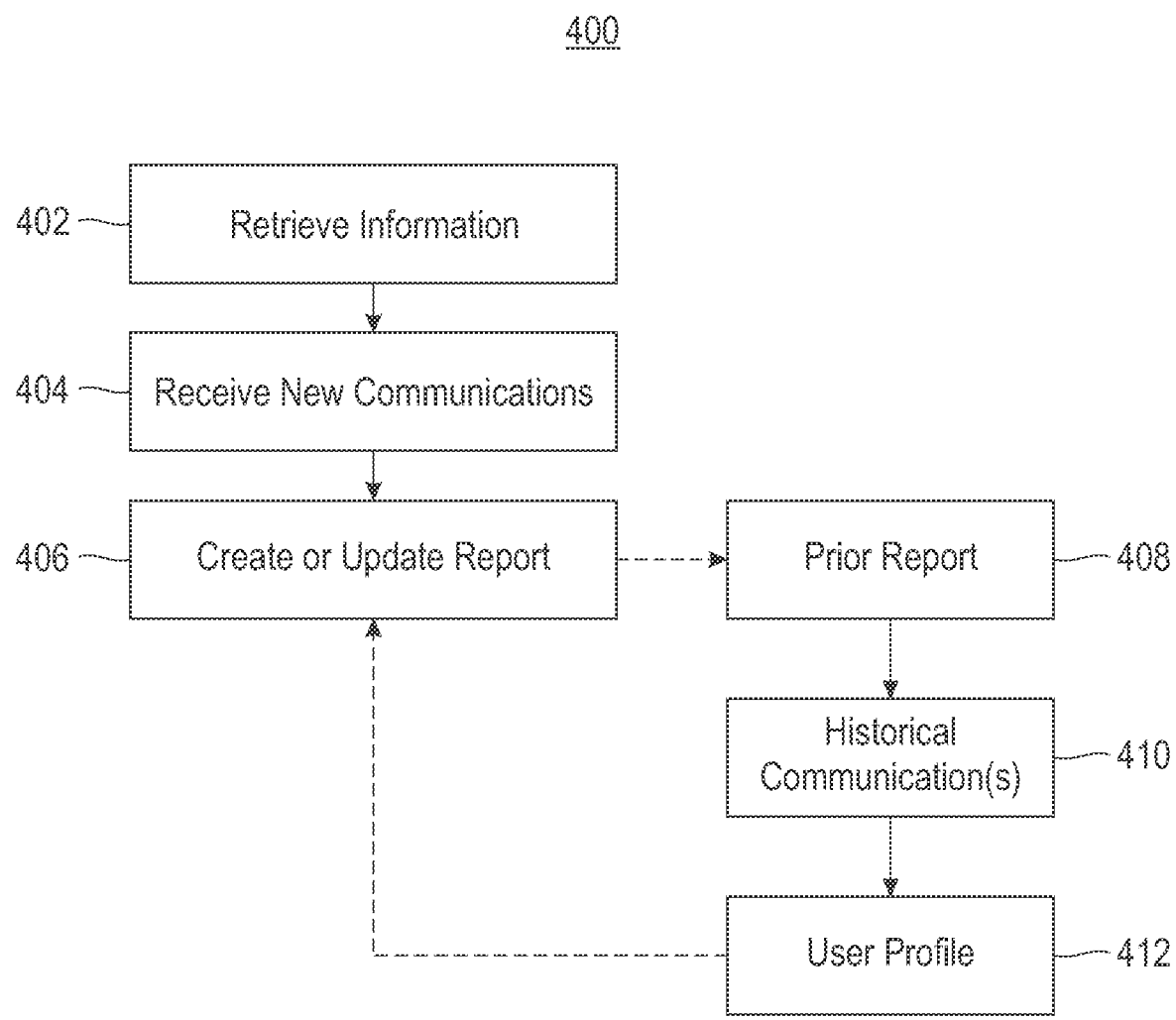
FIG. 4 depicts a flow diagram illustrating dataflow among different components in the overall system.

FIG. 4 is a flow diagram (400) illustrating dataflow among different components in the overall system. In one embodiment, the attention management solution is installed as a plug-in of a client of a unified messaging system on a client machine, including but not limited to, a personal computer, workstation, mobile device, etc. The unified messaging system periodically retrieves new communications, e.g. feeds, from various information channels (402). As new communications are received (404), a report e.g. an attention report, is created and presented from the current feeds associated with the information channels (406). In the case of a prior report generation (408), the interest of the user is modeled from historical communication(s) (410). The model builds a user profile (412) which is employed in the updated report. As described in detail below, the attention report of step (406) is presented on an associated visual display. The attention report represents one or more activity areas, with each activity area including a topic or task that has been deemed to deserve attention by the user. Specifically, each activity area is a defined community of interconnected participants. Each activity area is defined from the perspective of a single user. Participants in an activity area are connected to a single user, but not necessarily with each other. Each activity area consists of information on what the task is about and who the user is working with on that task. In one embodiment, a data clustering technique is employed to derive and organize messages into one or more activity areas. Accordingly, messages are received and organized based on specific characteristics inherent to the user.

Each unit of information about a user may come from various sources, such as a message or an online activity. The individual unit of information is referred to herein as a data item. The data item is represented as a tuple $\{W,U, t, r\}$, where W is the textual content of the communication after stemming and removing stop words, and in one embodiment is represented by a vector space, U is the people involved in the communication, e.g. the sender and receiver of the message, t is the time-stamp of the communication, and $r \in \{0,1\}$ is a reaction flag indicating if the user is actively involved in the associated item. For example, in one embodiment, if the user composes or replies to a message, the reaction flag is assigned to the integer one, and if the user ignores the messages or reads the message without responding, the reaction flag is set to zero. Intuitively, items with a reaction flag set to one are more likely to be perceived as more important by the user than those with a reaction flag set to zero. An activity area is represented as a tuple $\{G, f_w, f_u, tl, s_p\}$, where G is a set of data items that get clustered into this activity area, $f_w$ and $f_u$ are functions that return the weights of a given word or a given person in the activity area, respectively, tl is a label, and $s_p$ is a real-number importance score. The activity area contains information such as keywords, people, timelines, etc., and the label, tl, is selected for each activity area to describe the information contained therein.

As briefly described above, the activity areas are derived from clustering available data items. Given a group $G_i = \{e_1, \ldots, e_m\}$ of data items, the textual content of $e_1, \ldots, e_m$ are concatenated to create the textual content $W_i$ or $G_i$. The multi-set $P_i$ is the union of the people in $e_1, \ldots, e_m$. Similarly, the timeline $T_i$ of $G_i$ is a multi-set containing all the time-stamps of the items in $G_i$. Given two groups of $G_1$ and $G_2$ of data items, the similarity between $G_1$ and $G_2$ is computed as a linear combination of the similarities between textual contents, people, and timelines. Most real-world events and projects have a limited time span. If there is a long time span between two items, it is unlikely that they belong to the same topic. The following is a formula to assess the similarity between two groups of data items:

$$\text{sim }(G_1,G_2) = \beta_1 \cdot \text{sim }(W_1,W_2) + \beta_2 \cdot \text{sim }(P_1,P_2) + \beta_3 \cdot \text{sim }(T_1,T_2)$$

where $\beta_1, \beta_2, \beta_3 \in [0,1]$ are the combination weights of textual content, people, and time, respectively.

Both topic similarity and people similarity are measured. In one embodiment, cosine similarity is used to measure topic similarity, and Jaccard distance is used to measure people similarity. The following is a formula to measure the time distance between $G_1$ and $G_2$:

$$\text{sim }(T_1, T_2) = \alpha^{d(tc1, tc2)}$$

where $tc_1$ and $tc_2$ are the means of the time-stamps in $T_1$ and $T_2$, respectively, d ($tc_1$, $tc_2$) returns the difference between $tc_1$ and $tc_2$, and $\alpha \in [0,1]$ is a decay factor. The larger the difference between $T_1$ and $T_2$, the smaller the sim ($T_1, T_2$). Accordingly, as time passes, the importance of the communication decreases.

Figure 5:
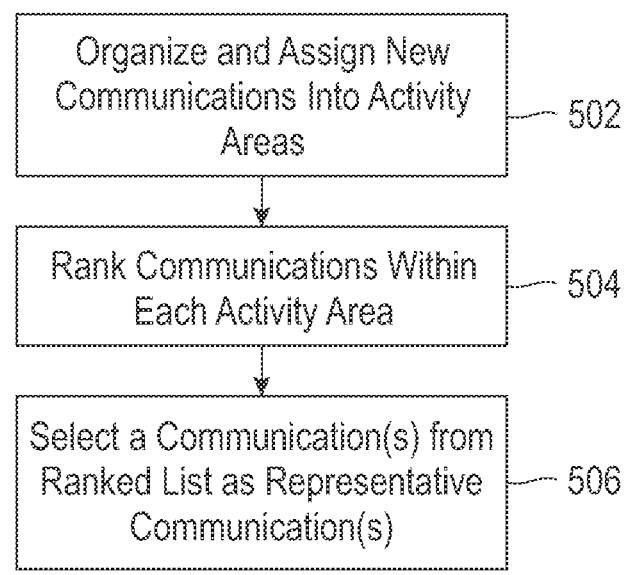
FIG. 5 depicts a flow chart illustrating a process for organizing and prioritizing communications.

Information about a user is learned by mining user historical data and automatically clustering the data into activity areas. FIG. 5 is a flow chart (500) illustrating a process for organizing and prioritizing communications. As new communications are received, they are organized and assigned to a new activity area or into a previously derived activity area (502). The received communications are then ranked (504). In one embodiment, the process of ranking communications is separate for each defined activity area. Factors which determine a communication's ranking level may include, but are not limited to, the similarity of the received communication with respect to the assigned activity area, the importance of a sender of the communication with respect to the assigned activity area in that task, or how recently the communication was received for the activity area. In one embodiment, the activity areas themselves are also ranked based on criteria such as priority of the communication within the activity area in comparison to communications in other defined activity areas, time-critical communications within an activity area in comparison to communications in other defined activity areas, and how recently communications were received in an activity area in comparison to communications in other defined activity areas. For each activity area, one or more communications are selected from the ranked list as a representative communication (506). Accordingly, received communications are organized in at least two aspects, including organization into activity areas and organization within activity areas.

Figure 6:
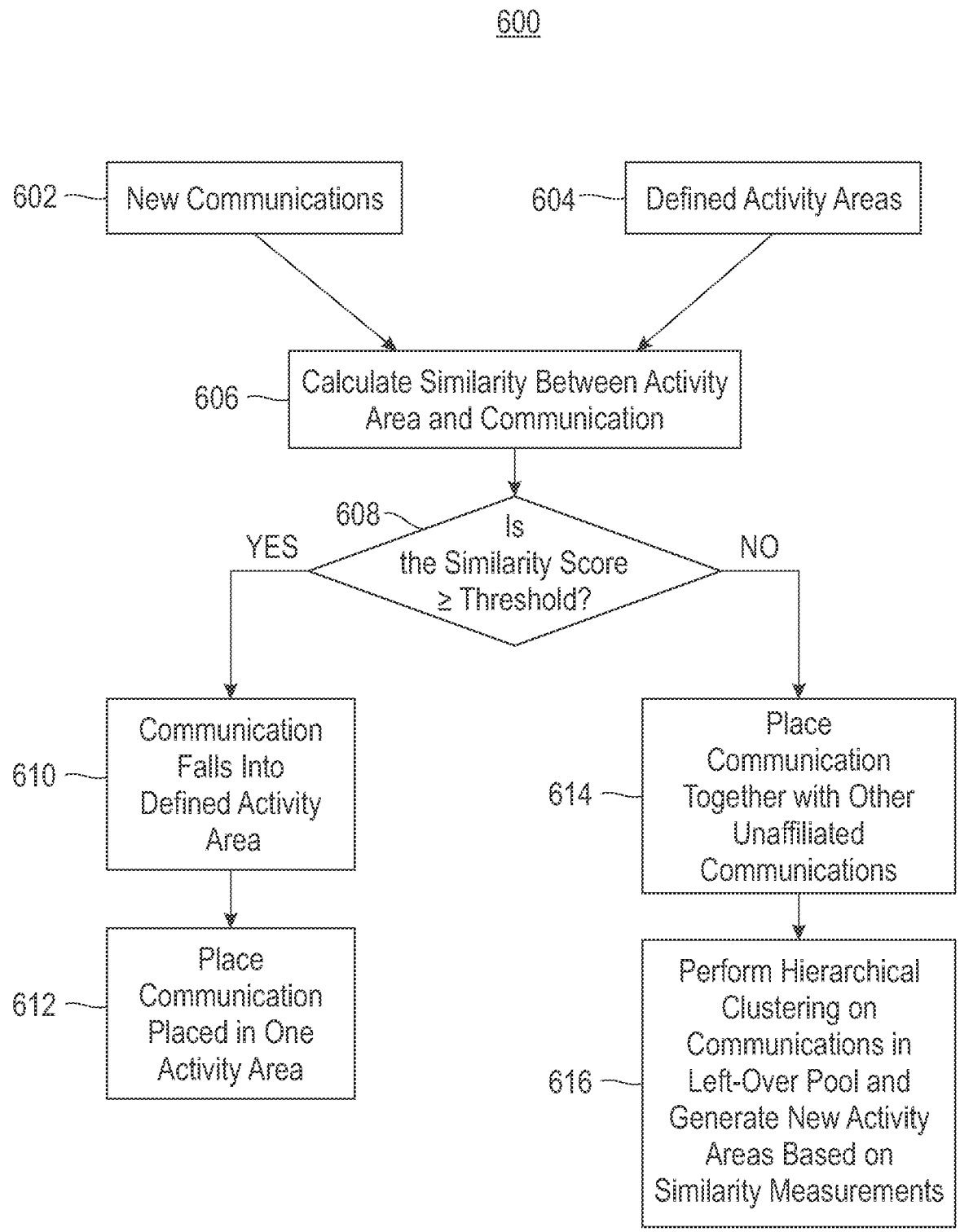
FIG. 6 depicts a flow chart illustrating details of the process for classification of communications with respect to one or more existing activity areas.

As shown above in FIG. 5, communications are classified and organized into activity areas. FIG. 6 is a flow chart (600) illustrating details of the process for classification of communications with respect to one or more existing activity areas. Two categories are employed as input for communication classification, specifically new communications that have been received (602) and any defined activity areas (604). In one embodiment, recipients or authors of communications may be included with the activity area input at (604). For each newly received communication, a similarity score between an existing activity area (604) and the new communication (602) is calculated (606). A plurality of factors may be employed for the calculation at step (606) including, but not limited to, the topic of the communication, the people involved in the communication, or timeline similarities between dates mentioned in the communication including the communication's date of receipt, and date(s) associated with the existing activity area.

The calculated similarity score of the newly received communication and the existing activity area is compared to a threshold (608). If a similarity score exceeds or is equal to an activity area's threshold, then the communication is determined to fall within at least one defined activity area (610). The communication is placed in one activity area (612). In one embodiment, a similarity measurement is used to place the newly received communication in the activity area with the strongest degree of similarity to the communication. In another embodiment, the communication can be placed into more than one activity area that meets or exceeds the threshold requirement. If a similarity score does not meet or exceed any existing activity area's threshold value, then the communication is placed together with any unaffiliated communications (614). Hierarchical clustering is then performed on all unaffiliated communications in the left-over pool to generate any new activity areas based on similarity measurements (616). Accordingly, the process shown in steps (602)-(616) is an iterative process for each received communication.

Figure 7:
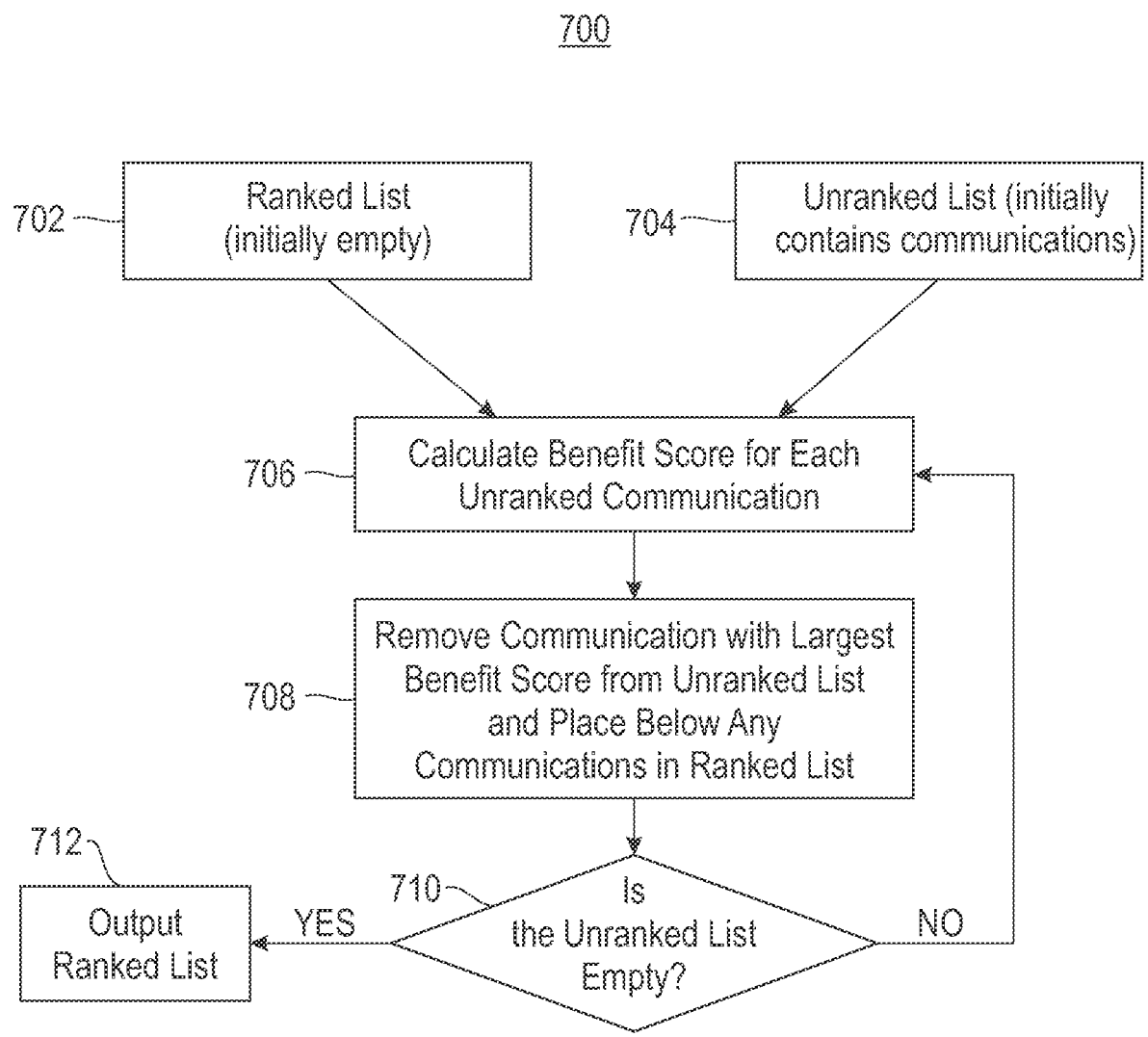
FIG. 7 depicts a flow chart illustrating a process for ranking communications in an activity area.

Communications are categorized and matched with activity areas in the user profile. An entry is created for each activity area that has a matching message. All the matching communications belong to that activity area. In one embodiment, some activity areas may be empty, and as such may not be displayed. FIG. 7 is a flow chart (700) illustrating a process for ranking communications in an activity area. Initially, the ranking list of communications S is empty (702), and an unranked list F contains all the communications in the activity area C (704). The lists at steps (702) and (704) are used together as input. A benefit score is calculated for each unranked communication in the activity area (706). The value of a communication depends on multiple factors, including but not limited to: how close the communication is to the topic of the activity area, the similarity of the communication as compared with other communications previously read by the user, a user preference from a specific sender, and how recently the communication was received. Based on these observations, the following is a formula for quantifying the benefit score:

$$B(F,S,k) = \text{sim}(k, C) - \text{sim}(k, S) + \text{sim}(k, P\ R)$$

where k is the communication, Sim (k, C) and sim (k, S) measure the similarity between communication k and the activity area C and the communications already chosen in S, respectively. Sim (k, P R) measures the closeness between the communication k against the user's preference. The following is a formula to assess sim (k, P R):

$$\text{Sim}(k, P\ R) = (P_k - P_{min})/(P_{max} - P_{min}) + (T_{now} - T_k)/(T_{now} - T_{earliest})$$

Accordingly, a plurality of factors may be employed to calculate the benefit score including, but not limited to, the importance level of a sender in the activity area, the similarity between the communication and the activity area, and how recent the communication was received, e.g. recency.

The communication with the largest benefit score is removed from the unranked communication list and placed within the ranked communication list below any communications already in the ranked communication list (708). If the unranked communication list is empty (710), the ranked communication list is outputted (712). This ranked communication list is per activity area. Once this ranked list is created, the presentation of the ranking communication list is prepared for display so that one or more representative communications for this activity area can be chosen and displayed on the visual display. This is explained in detail in FIG. 8. If the unranked communication list is not empty, the process returns to step (706). Accordingly, messages within each activity area are assessed and ranked.

Figure 8:
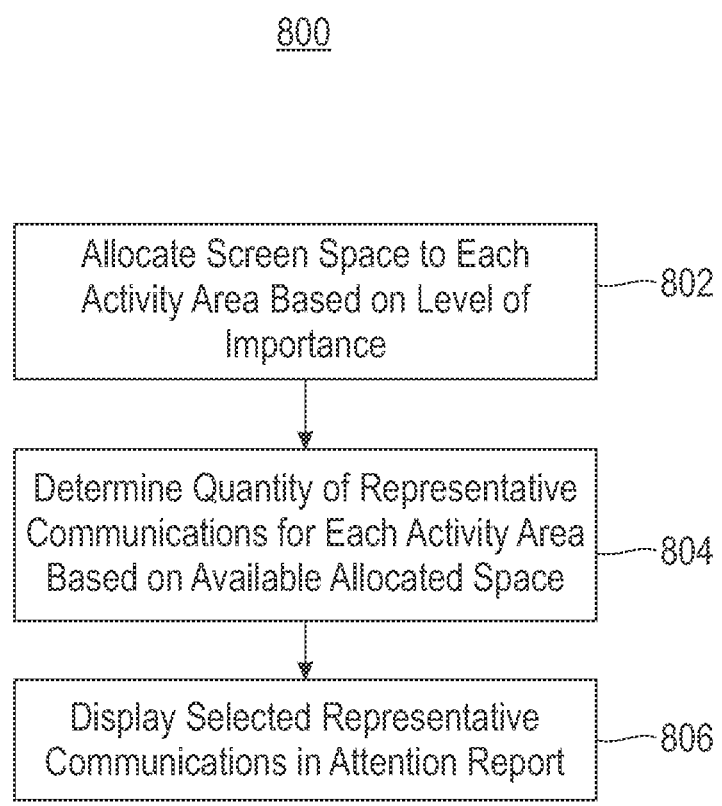
FIG. 8 depicts is a flow chart illustrating a process for selecting representative communications for each activity area in an attention report.

Once the order of the communications inside the activity area is determined, the ordered communication list is presented. In one embodiment, one or more representative communications are displayed for each activity area. The number of representative communication may be user specified. FIG. 8 is a flow chart (800) illustrating a process for selecting representative communications for each activity area in an attention report. Each active activity area, defined as an activity area with at least one newly received communication, is allocated a portion of computer readable screen space based on its level of importance (802). The quantity of representative communications displayed for each active activity area is determined based on the available space allocated to an activity area (804). The determined quantity of representative communications are selected from an activity area's corresponding ranked list and displayed in the attention report (806). Accordingly, the presentation of communications is based on selection of one or more representative messages per activity area.

As described herein, there may be a plurality of activity areas, and there may be a need to rank the activity areas in addition to ranking communications within activity areas. To assess the activity areas, the weights of the words and people are measured, the importance score of the activity area is computed, and a representative label is selected for the activity area. For a given word $w_i$, $f_w(w_i)=0$ if $w_i$ is a stop word or a common word, otherwise $f_w(w_i)$ is the number of data items in the activity area that contain $w_i$ in their textual contents. Similarly, given a person $u_j$, $f_u(u_j)$ is the number of data items in the activity area that contain $u_j$. Following the evaluation of the words and people in an activity area, the importance of the activity area is measured. Let $L = \{e_1, \ldots, e_m\}$ be the list of the data items in the activity area G sorted by the most recent, such that $e_i$ is more recent than $e_j$ when i<j. In one embodiment, the normalized discounted cumulative gain (NDGC) is employed to estimate the importance of the activity area based on user reactions to data items that were clustered into this area, as follows:

$$S_p = NDCG(L, E_p) = Z_x \sum_{i=1}^{x} (2^{r_i} - 1)/log_2(i+1)$$

Where $E_p$ is the set of data items with a positive reaction flag, $r_i$ is one if the ith item of L is in $E_p$ and $r_i$ is zero otherwise. $Z_x$ is chosen so that an all positive list has an NDCG value of one. Based upon the above measurement, the reactions to more recent items have greater effect on the importance score. More specifically, the formulas employed herein capture the trend of the importance of the activity area perceived by the user. In one embodiment, if a user loses interest in a topic and begins to ignore relevant communications, the importance score associated with the topic will decrease. Accordingly, the importance measurement is adaptive to the behavior of the user.

Once the activity areas are formed, a label may be assigned to the activity area to distinguish it from other formed activity areas. In one embodiment, the label is in the form of a keyword important to the activity area and distinguishable from other activity areas. For example, in one embodiment, a representation score is computed for each word in an activity area, and the word with the highest representation score is selected as the label. Based on this principle, given a word $w_i$, its representation score with regards to an activity area is calculated as follows:

$$rs(w_i) = f_w(w_i) \log(|F|/|Fw_i|)$$

where $f_w(w_i)$ is the weight of $w_i$ in the activity area, $|F|$ is the total number of the user's activity areas, and $|Fw_i|$ is the number of the user's activity area that contain $w_i$ as one of their top x keywords. Accordingly, the label is selected after an analysis of the keywords in each activity area.

Figure 9:
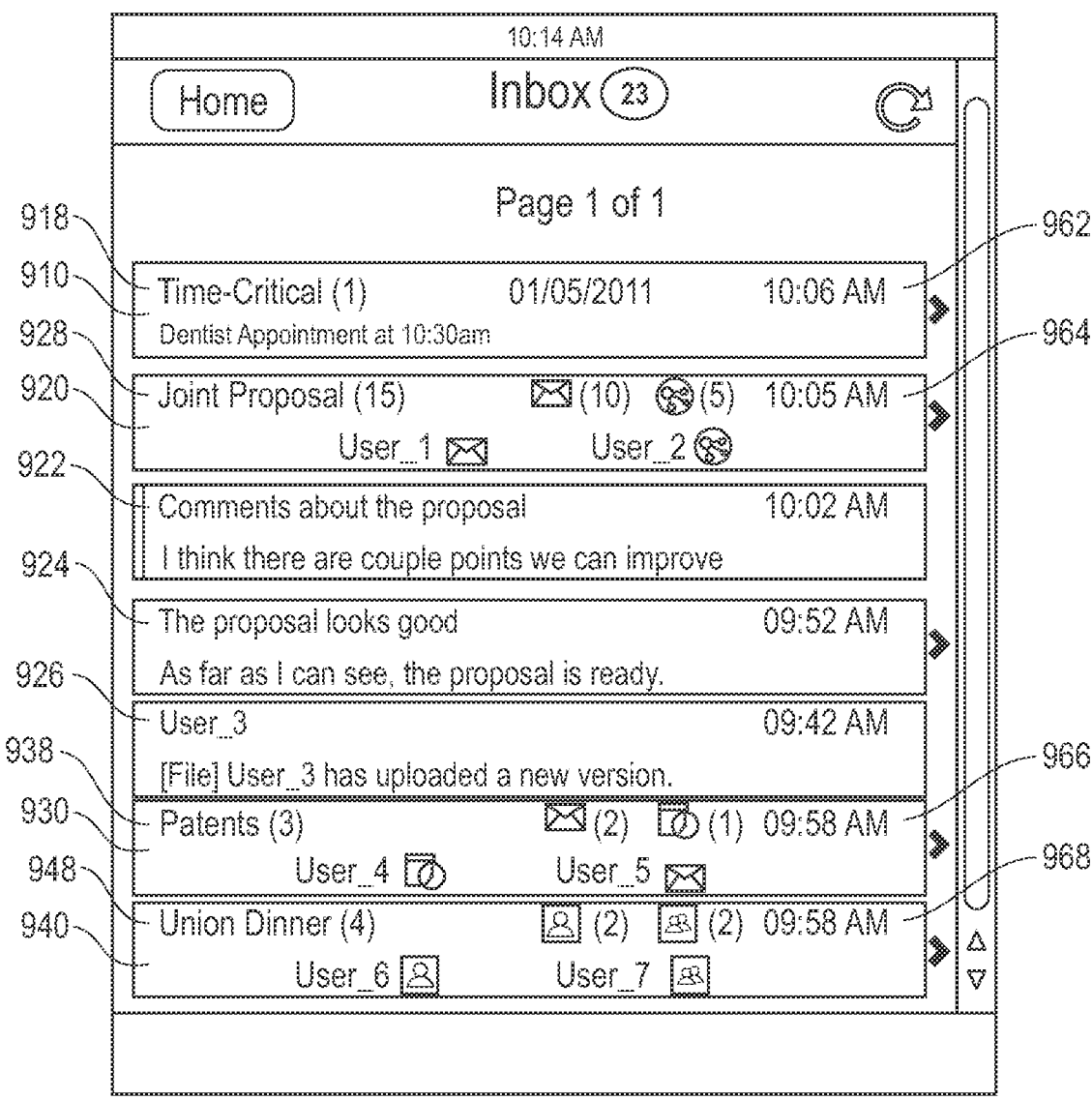
FIG. 9 depicts a block diagram of a sample interface illustrating grouping of communications and selection of one or more representative communications for each activity area.

Following the assessments of communications as described above, a report is generated. In one embodiment, the report is concise. Three facets are utilized to organize and create the report, including topic, important contacts, and time-critical. Examples of time-critical communications may be more recently received communications or time sensitive communications. FIG. 9 is a block diagram (900) illustrating a sample report. As shown, there are four task categories (910), (920), (930), and (940). The first, third, and fourth categories (910), (930), and (940), respectively, are shown with one representative message each. In one embodiment, the number of representative messages per task category can be specified. In one embodiment, the boundary of the representative message list is determined. The first task category (910) pertains to time critical matters, and the remaining task categories are placed in an order of measurement. The second task category (920) is shown with three representative messages (922), (924), and (926). Each of the task categories (920)-(940) are placed in this order based upon the order measurements described above. Similarly, each of the task categories (910)-(940) is provided with a label (918), (928), (938), and (948). In addition, each of the task categories (910)-(940) is provided with a time stamp (962), (964), (966), and (968) illustrating receipt of the last communication in the associated task category.

Within some of the categories, indicia is provided to illustrate that additional communication(s) or information is available in the associated category. More specifically, the representative communication is merely one message among a plurality of messages in the category. Accordingly, the communications are organized with a label describing each category and a representative message for each category.

Figure 10:
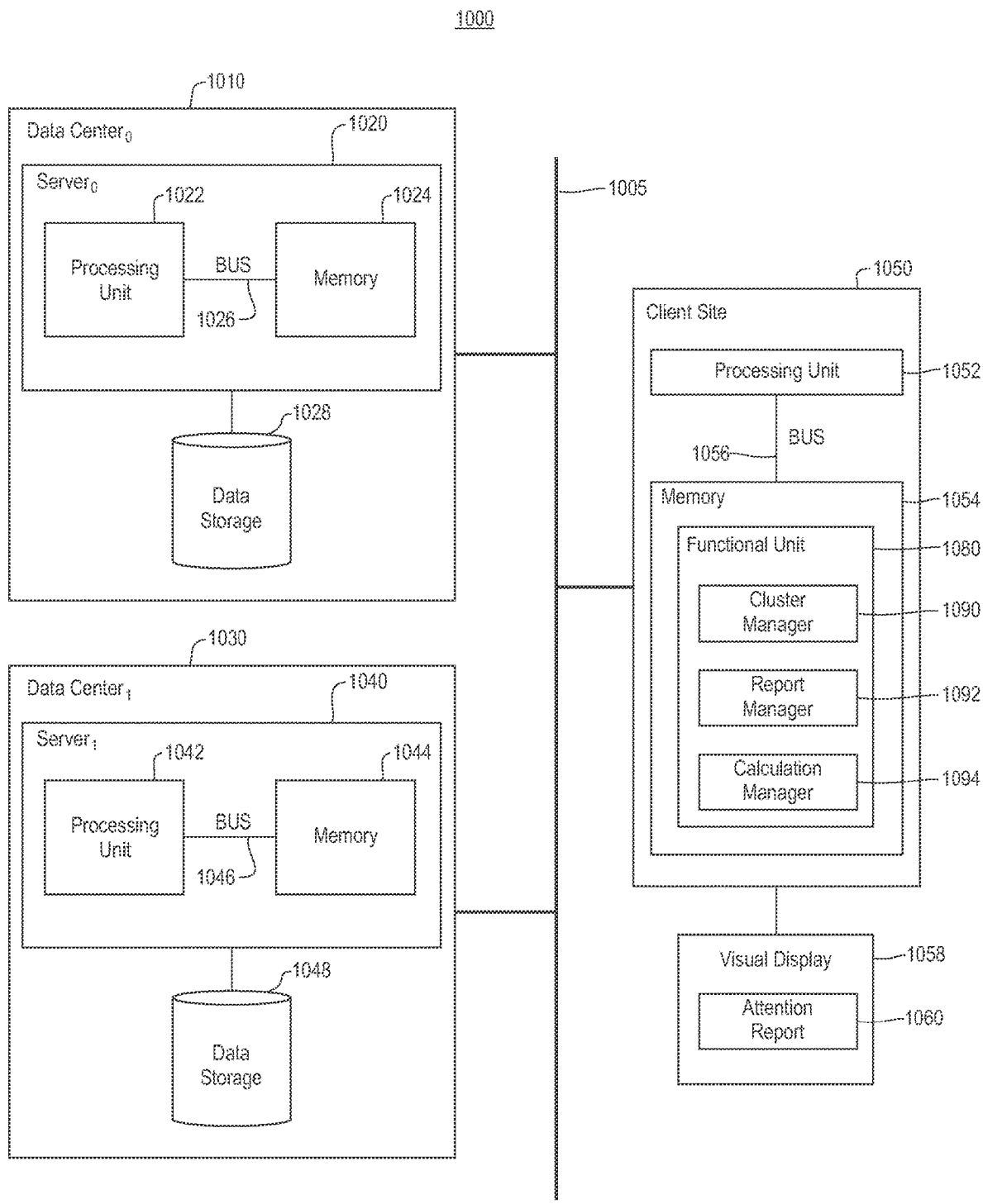
FIG. 10 depicts a block diagram illustrating tools embedded in a computer system for categorization and prioritization of communications.

As shown in FIGS. 4-9 described above, a method is provided to support categorization and prioritization of communications in a unified messaging system. Searching for relevant messages is reduced by providing an adaptive technique that accounts for factors of importance, sensitivity, and relevance, as well as input from the user. FIG. 10 is a block diagram (1000) illustrating tools embedded in a computer system to support the adaptive technique employed for categorizing and prioritizing communications. More specifically, a shared pool of configurable computer resources is shown with a first data center (1010) and a second data center (1030). Although two data centers are shown in the example herein, the invention should not be limited to this quantity of data centers in the computer system. Accordingly, one or more data centers may be employed for organization and prioritization of communications in the unified message system.

Each of the data centers in the system is provided with at least one server in communication with data storage. More specifically, the first data center (1010) is provided with a server (1020) having a processing unit (1022), in communication with memory (1024) across a bus (1026), and in communication with data storage (1028); and the second data center (1030) is provided with a server (1040) having a processing unit (1042), in communication with memory (1044) across a bus (1046), and in communication with second local storage (1048). Server (1020) may communicate with server (1040) across a network connection (1005).

A client site (1050) is shown in communication with the first data center (1010) and the second data center (1030). The client site (1050) includes a processing unit (1052) in communication with memory (1054) across a bus (1056). The client site (1050) is also provided with a visual display (1058). In one embodiment, the client site (1050) may be in the form of a personal computer, a laptop computer, a mobile communication device, etc. A functional unit (1080) is provided local to the client site (1050) or one of the data centers (1010) and (1030). For descriptive purposes, the functional unit (1080) is described herein as local to the client site (1050). The functional unit (1080) is provided with one or more tools to support the aspect of managing communications, and more adaptively organizing communications based upon the behavioral characteristics of the user. The tools include, but are not limited to, a cluster manager (1090), a report manager (1092), and a calculation manager (1094). Together, the managers and their functionality support the adaptive organization of communications.

The cluster manager (1090) is provided to form groups of electronic communications in the form of clustered data, and to derive at least one activity area from the clustered data. Each communication is either placed in one of the activity areas formed by the cluster manager (1090), or placed in a general pool for delayed classification and placement. The report manager (1092) is in communication with the cluster manager (1090), and functions to generate an attention report (1060) presented on the visual display (1058) of the client site (1050). More specifically, the attention report (1060) illustrates the formed activity areas to which each communication is grouped. As described above and shown in FIG. 9, a representative communication is provided for each activity area in the attention report (1060).

As described above in FIGS. 4-9, the manner and presentation of the report (1060) is multi-dimensional. The cluster manager (1090) assigns the following elements to each activity area: an importance level, a topic list, an activity area contributor list, etc., with each contribution having an associated importance level. Furthermore a calculation manager (1094) is provided in communication with the cluster manager (1090) to support and enable computation of a benefit score for each communication. In one embodiment, the benefit score is a factor in ranking of communications, including but not limited to: importance level of a sender in the activity area, similarity between the communication and the activity area, and/or the timespan relationship of the communication to other communications already selected by the user. As further described and illustrated in FIGS. 4-9, there is a limited amount of space to show the communications on the visual display. The report manager (1092) determines a quantity of representative communications for each activity area, and in one embodiment, the quantity is based on an importance measurement level associated with the activity area. Accordingly, one or more representative communications are selected for each activity area by the report manager (1092).

When classifying each communication, the cluster manager (1090) calculates a similarity between each communication with the derived activity areas. More specifically, the cluster manager (1090) computes a threshold based on the calculated similarity of communications that are already grouped in the activity areas. The threshold is employed as a comparison factor to determine the commonality between the communication being assessed and selection of an activity area. The communication is added to the activity area by the cluster manager (1090) when the similarity of the subject communication with the activity area exceeds its threshold. Otherwise, the cluster manager (1090) places the communication in a general pool. Based on the communication membership in the general pool, the cluster manager (1090) hierarchically clusters all of the communications to generate a new activity area based on the results of the similarity measurements. More specifically, the cluster manager (1090) assesses the similarity characteristics among the communications in the general pool to try to form a new activity area for placement of the communications. Accordingly, the cluster manager (1090) selectively places communications in activity areas.

The cluster manager (1090), report manager (1092), and calculation manager (1094) are configured to address adaptive creation of activity areas and assignment of communications to the created activity areas. As identified above, the cluster manager (1090), report manager (1092), and calculation manager (1094), are shown residing in memory (1054) of the client machine (1050). In one embodiment, the cluster manager (1090), report manager (1092), and calculation manager (1094) may reside in memory local to one or more of the data centers. Similarly, in one embodiment, the cluster, report, and calculation managers, respectively, may reside as hardware tools external to memory and may be implemented as a combination of hardware and software, or may reside local to memory of any one of the data centers or client sites in the shared pool of resources. Similarly, in one embodiment, the managers may be combined into a single functional item that incorporates the functionality of the separate items. As shown herein, each of the manager(s) are shown local to one data center. However, in one embodiment they may be collectively or individually distributed across the shared pool of configurable computer resources and function as a unit to manage dynamic file sharing collaboration while mitigating data leakage. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
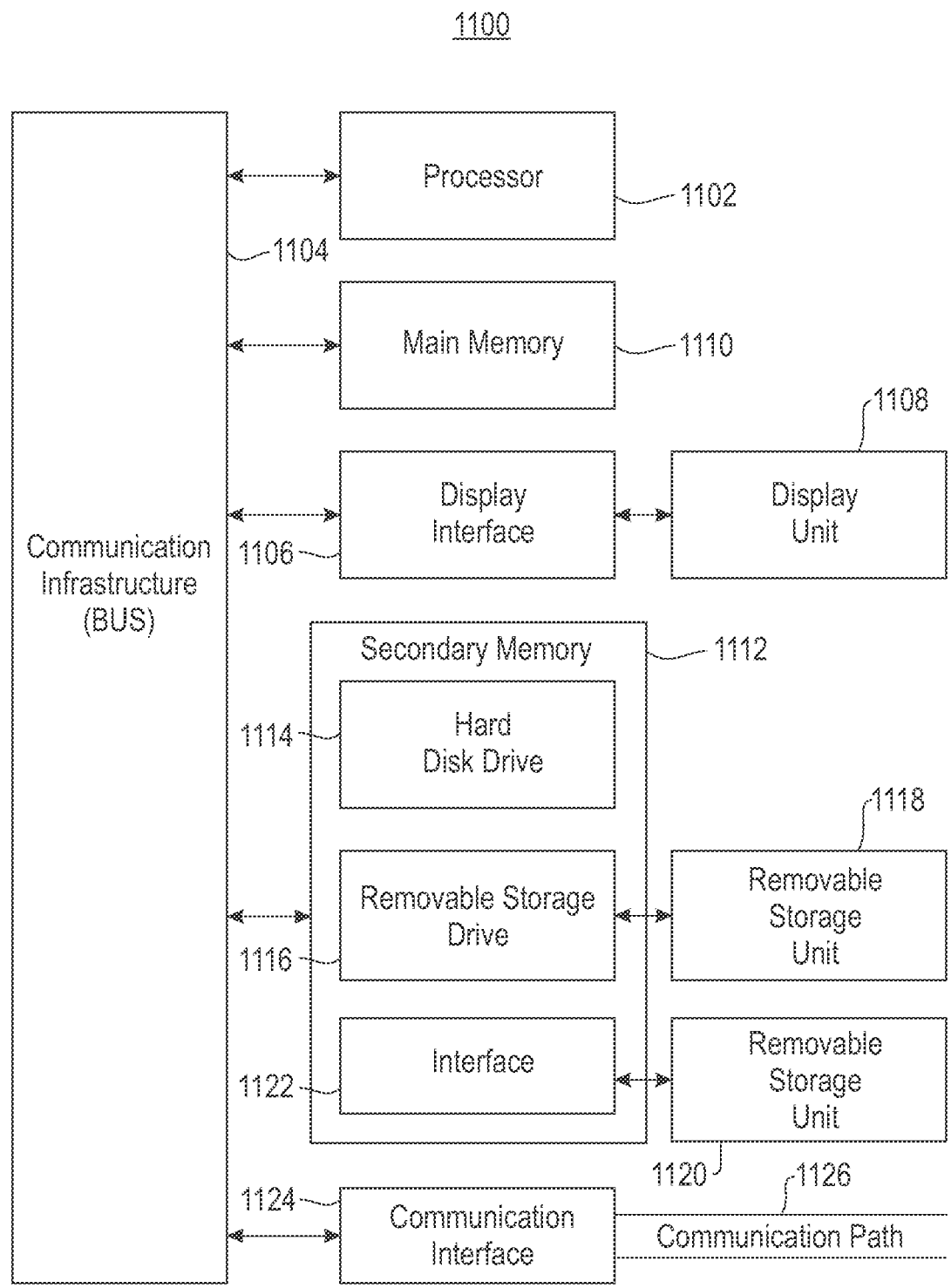
FIG. 11 depicts a block diagram showing a system for implementing an embodiment of the present invention.

Referring now to FIG. 11 is a block diagram (1100) showing a system for implementing an embodiment of the present invention. The computer system includes one or more processors, such as a processor (1102). The processor (1102) is connected to a communication infrastructure (1104) (e.g., a communications bus, cross-over bar, or network). The computer system can include a display interface (1106) that forwards graphics, text, and other data from the communication infrastructure (1104) (or from a frame buffer not shown) for display on a display unit (1108). The computer system also includes a main memory (1110), preferably random access memory (RAM), and may also include a secondary memory (1112). The secondary memory (1112) may include, for example, a hard disk drive (1114) and/or a removable storage drive (1116), representing, for example, a floppy disk drive, a magnetic tape drive, or an optical disk drive. The removable storage drive (1116) reads from and/or writes to a removable storage unit (1118) in a manner well known to those having ordinary skill in the art. Removable storage unit (1118) represents, for example, a floppy disk, a compact disc, a magnetic tape, or an optical disk, etc., which is read by and written to by removable storage drive (1116). As will be appreciated, the removable storage unit (1118) includes a computer readable medium having stored therein computer software and/or data.

In alternative embodiments, the secondary memory (1112) may include other similar means for allowing computer programs or other instructions to be loaded into the computer system. Such means may include, for example, a removable storage unit (1120) and an interface (1122). Examples of such means may include a program package and package interface (such as that found in video game devices), a removable memory chip (such as an EPROM, or PROM) and associated socket, and other removable storage units (1120) and interfaces (1122) which allow software and data to be transferred from the removable storage unit (1120) to the computer system.

The computer system may also include a communications interface (1124). Communications interface (1124) allows software and data to be transferred between the computer system and external devices. Examples of communications interface (1124) may include a modem, a network interface (such as an Ethernet card), a communications port, or a PCMCIA slot and card, etc. Software and data transferred via communications interface (1124) are in the form of signals which may be, for example, electronic, electromagnetic, optical, or other signals capable of being received by communications interface (1124). These signals are provided to communications interface (1124) via a communications path (i.e., channel) (1126). This communications path (1126) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1110) and secondary memory (1112), removable storage drive (1116), and a hard disk installed in hard disk drive (1114).

Computer programs (also called computer control logic) are stored in main memory (1110) and/or secondary memory (1112). Computer programs may also be received via a communication interface (1124). Such computer programs, when run, enable the computer system to perform the features of the present invention as discussed herein. In particular, the computer programs, when run, enable the processor (1102) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to application processing and disaster recovery, including, but not limited to, supporting separation of the location of the data from the application location and selection of an appropriate recovery site.

Alternative Embodiment

It will be appreciated that, although specific embodiments of the invention have been described herein for purposes of illustration, various modifications may be made without departing from the spirit and scope of the invention. In particular, the system can be applied to other applications, such as news filtering and alert notification. Accordingly, the scope of protection of this invention is limited only by the following claims and their equivalents.

I claim:

1. A method comprising:
generating, by a computer system comprising a processing unit in communication with a data storage, a unified messaging interface incorporating data items from respective electronic communications;
applying a time stamp to each respective data item;
deriving at least a first activity area and a second activity area from the generated data items and creating one or more groupings of communications, including clustering the data items into one or more of the first and second activity areas based at least on a similarity score, wherein the clustering of data items comprises computing the similarity score between two groups of data items as a linear combination of similarities of the two groups of data items, the similarities being a time span between the time stamps of data items;
representing each of the first and second activity areas in a vector space as a tuple comprising the clustered data items, wherein each of the first and second activity areas is further defined based on a task and each of the activity areas represents a defined community of interconnected participants associated with the task;
generating a first attention report for visual display at a first client site in communication with a data center, the generated first report based on one or more characteristics inherent to the first client site and illustrating one or more created groupings of communications, including selecting a representative communication for each activity area in the first attention report, wherein each activity area is a defined community of interconnected participants, and at least one of the activity areas comprising a time critical communication is prioritized over a different activity area, wherein a data item criticality is determined based on the time span between time stamps of data items;
in response to receiving a first new electronic communication local to the first client site, generating a new data item for the new electronic communication;
modeling the new data item in relation to one or more characteristics inherent to the first generated report, including comparing the new data item to each derived activity area, and classifying the new data item into one of the activity areas based on the comparison, wherein the similarity score is associated with similarity between the new data item and the data items of one of the first and second activity areas;
generating a second attention report incorporating the modeled data item into an area selected from the group consisting of: one of the activity areas and placement with an unaffiliated data item; and
displaying the second attention report at the first client site, wherein, when the similarity score exceeds a threshold of the first and second activity areas the communication is added to one of the first and second activity areas, and when the similarity score does not meet any threshold the communication is placed in a general pool.

2. The method of claim 1, wherein the first and second activity areas includes an assigned importance level, a topic list, and an activity area contributor list, wherein the contributor list comprises at least one contributor, and wherein each contributor on the contributor list comprises an associated contributor importance level.

3. The method of claim 1, further comprising ranking communications in each of the first and second activity areas, including calculating a benefit score for each communication, and employing the calculated benefit score as a factor in the ranking.

4. The method of claim 3, wherein the benefit score includes a factor selected from the group consisting of: importance level of a sender in the activity area, similarity between the communication and the first and second activity areas, the recency of the communication and other communications, and combinations thereof.

5. The method of claim 3, further comprising determining a quantity of representative communications for each of the first and second activity areas.

6. The method of claim 5, wherein space allowed for the quantity of representative communications in the second attention report is proportional to an importance measurement level associated with the first and second activity areas.

7. The method of claim 1, further comprising performing hierarchical clustering on all communications in the general pool and generating a new activity area based on similarity measurements among the communications in the general pool.

8. A computer program product for use with electronic communication data, the computer program product comprising a computer readable non-transitory storage medium having computer readable program code embodied thereon, the program code which when executed causes a computer to:
generate, by a computer system comprising a processing unit in communication with a data storage, a unified message interface incorporating data items from respective electronic communications;
apply a time stamp to each respective communication;
derive at least one activity area from the generated data items to create one or more groupings of communications, including clustering the generated data items into one or more respective activity areas based at least on a similarity score, wherein the clustering of data items further comprises computing the similarity score between two groups of data items as a linear combination of similarities of the two groups of data items, the similarities being a time span between the time stamps of data items;
represent each activity area as a tuple comprising information associated with the clustered data items, wherein each of the first and second activity areas is further defined based on a task and each of the activity areas represents a defined community of interconnected participants associated with the task;
generate a first attention report for visual display at a first client site in communication with a data center, the generated first report based on one or more characteristics inherent to the first client site and illustrate one or more created groupings of communications, including select a representative communication for each activity area in the first attention report, wherein each activity area is a defined community of interconnected participants, and at least one of the activity areas comprising a time critical communication is prioritized over another activity area, wherein a data item criticality is determined based on the time span between time stamps of data items;

in response to receipt of a first new electronic communication local to the first client site, generate a new data item for the new electronic communication;

model the new data item in relation to one or more characteristics inherent to the first generated report, including compare the new data item to each activity area, and classify the new data item into one of the activity areas based on the comparison, wherein the similarity score is associated with similarity between the new data item and the data items of one of the first and second activity areas;

generate a second attention report to incorporate the modeled data item into an area selected from the group consisting of: one of the activity areas and placement with an unaffiliated data item; and display the second attention report at the first client site, wherein, when the similarity score exceeds a threshold of the first and second activity areas the communication is added to one of the first and second activity areas, and when the similarity score does not meet any threshold the communication is placed in a general pool.

9. The computer program product of claim 8, further comprising program code to assign an importance level to each activity area and rank communications within each activity area, including calculating a benefit score for each communication, and program code to employ the calculated benefit score as a factor in the communication ranking.

10. The computer program product of claim 9, further comprising program code to calculate the benefit score based on a factor selected from the group consisting of: importance level of a sender in this activity area, similarity between the communication and the activity area, the recency of the communication and other communications already seen by the user, and combinations thereof.

11. The computer program product of claim 9, further comprising program code to determine a quantity of representative communications for each activity area, wherein space allowed for the quantity of representative communications in the second attention report is proportional to an importance measurement level associated with the first and second activity areas.

12. The computer program product of claim 8, further comprising program code to perform hierarchical clustering on all communications in the general pool and to generate a new activity area based on similarity measurements among the communications in the general pool.

13. A system comprising:
a shared pool of configurable resources, the shared pool including a physical host in communication with a plurality of physical machines, the physical host having a processing unit in communication with memory and data storage and a unified message interface, wherein the processing unit is configured to:
incorporate data items from respective electronic communications;
apply a time stamp to each respective communication;
derive a first activity area and a second activity area from the generated data items and create one or more groupings of communications, including clustering the data items into one or more of the first and second activity areas based at least on a similarity score, wherein the clustering of data items further comprises computing the similarity score between two groups of data items as a linear combination of similarities of the two groups of data items, the similarities being a time span between the time stamps of data items;
represent each of the first and second activity areas in a vector space as a tuple comprising the clustered data items, wherein each of the first and second activity areas is further defined based on a task and each of the activity areas represents a defined community of interconnected participants associated with the task; and
in response to receiving a new electronic communication:
generate a first attention report for visual display at a first client site in communication with a data center, the generated first report based on one or more characteristics inherent to the first client site and illustrate one or more created groupings of communications, including select a representative communication for each activity area in the first attention report, wherein each activity area is a defined community of interconnected participants, and at least one of the activity areas comprising a time critical communication is prioritized over a different activity area, wherein a data item criticality is determined based on the time span between time stamps of data items;
generate a new data item for the new electronic communication;
model the new data item in relation to one or more characteristics inherent to the first generated report, including compare the new data item to each activity area, and classify the new data item into one of the activity areas, wherein the similarity score is associated with similarity between the new data item and the data items of one of the first and second activity areas;
generate a second attention report incorporating the modeled data item into an area selected from the group consisting of: one of the activity areas and placement with an unaffiliated data item; and
display the second attention report at the first client site, wherein, when the similarity score exceeds a threshold of the first and second activity areas the communication is added to one of the first and second activity areas, and when the similarity score does not meet any threshold the communication is placed in a general pool.

14. The system of claim 13, further comprising the processing unit to assign the first and second activity areas an importance level, a topic list, and an activity area contributor list, wherein the contributor list comprises at least one contributor, and wherein each contributor on the contributor list comprises an associated contributor importance level.

15. The system of claim 13, further comprising the processing unit to compute a benefit score for each communication, the benefit score being a factor in ranking of the communications.

16. The system of claim 15, further comprising the processing unit to determine a quantity of representative communications for each activity area.

17. The system of claim 16, further comprising the processing unit to determine space allowed for the quantity of representative communications based on an importance measurement level associated with the first and second activity areas.

18. The system of claim 13, further comprising the processing unit to hierarchically cluster all communications in the general pool and generate a new activity area based on similarity measurements among the communications in the general pool.

* * * * *